(12) United States Patent  (10) Patent No.: US 8,256,980 B2
Walter et al.  (45) Date of Patent: Sep. 4, 2012

(54) ASSEMBLY COMPRISING A CARRIER PART AND A BALL JOINT HOUSING

(75) Inventors: Harald Walter, Duisburg (DE); Steven P. Levesque, St. Catharines (CA)

(73) Assignee: TRW Automotive GmbH, Alfdorf (DE)

( * ) Notice: Subject to any disclaimer, the term of this patent is extended or adjusted under 35 U.S.C. 154(b) by 559 days.

(21) Appl. No.: 12/279,902

(22) PCT Filed: Dec. 6, 2006

(86) PCT No.: PCT/EP2006/011723
§ 371 (c)(1),
(2), (4) Date: Jan. 26, 2009

(87) PCT Pub. No.: WO2007/095983
PCT Pub. Date: Aug. 30, 2007

(65) Prior Publication Data
US 2009/0129854 A1 May 21, 2009

(30) Foreign Application Priority Data

Feb. 22, 2006 (DE) .......................... 10 2006 008 252

(51) Int. Cl.
*F16C 11/06* (2006.01)
(52) U.S. Cl. ............... 403/135; 280/93.511; 280/93.512
(58) Field of Classification Search .................. 403/122, 403/132, 133, 134, 135, 160; 280/93.51, 280/93.511, 93.512
See application file for complete search history.

(56) References Cited

U.S. PATENT DOCUMENTS

| 2,905,492 | A |   | 9/1959  | Alexander |         |
|-----------|---|---|---------|-----------|---------|
| 3,058,765 | A | * | 10/1962 | Thomas    | 403/133 |
| 4,283,833 | A |   | 8/1981  | Pyles     |         |
| 5,149,067 | A | * | 9/1992  | Fruhauf et al. | 403/132 |
| 5,165,306 | A | * | 11/1992 | Hellon    | 403/133 |
| 5,282,396 | A | * | 2/1994  | Crandall  | 403/132 |
| 7,121,757 | B2 |   | 10/2006 | Ersoy et al. |    |
| 2006/0088373 | A1 | * | 4/2006 | Haight  | 403/122 |

FOREIGN PATENT DOCUMENTS

| CH | 301 309    |   | 8/1954  |
|----|------------|---|---------|
| CH | 514 081    |   | 10/1971 |
| DE | 887 610    |   | 8/1953  |
| DE | 102 06 622 |   | 8/2003  |
| EP | 0 322 526  | * | 7/1989  |
| EP | 0 546 609  |   | 6/1993  |
| FR | 2176294    |   | 10/1973 |
| JP | 10-37945   |   | 2/1998  |
| JP | 2004-257503|   | 9/2004  |
| WO | 2005/012740|   | 2/2005  |

OTHER PUBLICATIONS

German Search Report issued Jun. 4, 2007.

* cited by examiner

*Primary Examiner* — Michael P Ferguson
(74) *Attorney, Agent, or Firm* — MacMillan Sobanski & Todd, LLC

(57) ABSTRACT

An assembly comprises a carrier part and a ball joint housing. The housing is provided with an attachment projection which is formed integrally with the housing on an outer surface of the housing. The carrier part is formed as a double-layer structure, and the attachment projection is held between two layers of the carrier part.

12 Claims, 12 Drawing Sheets

ASSEMBLY COMPRISING A CARRIER PART AND A BALL JOINT HOUSING

CROSS-REFERENCE TO RELATED APPLICATIONS

This application is a National Stage of International Application No. PCT/EP2006/011723 filed Dec. 6, 2006, the disclosures of which are incorporated herein by reference in entirety, and which claimed priority to German Patent Application No. 10 2006 008 252.4 filed Feb. 22, 2006, the disclosures of which are incorporated herein by reference in entirety.

BACKGROUND OF THE INVENTION

The invention relates to an assembly comprising a carrier part and a ball joint housing. The invention in particular relates to a vehicle suspension part having a ball joint housing attached thereto.

In order to fasten a ball joint to a stamped sheet metal vehicle suspension part such as a chassis link control arm, it is known to forge a flange onto a housing of the ball joint and to fasten this flange to the suspension part by means of rivets or screws. A disadvantage here is the comparatively great effort in installation as well as overall component costs, specifically the forged housing.

BRIEF SUMMARY OF THE INVENTION

A feature of the invention consists in providing an assembly comprising a carrier part and a ball joint housing which allows to securely attach the ball joint housing with reduced costs and where only a small clearance space is available.

In order to solve this feature, the invention provides an assembly comprising a carrier part and a ball joint housing, the housing being provided with an attachment projection which is formed integrally with the housing on an outer surface of the housing, wherein the carrier part is formed as a double-layer structure and the attachment projection is held between two layers of the carrier part. This design allows to securely attach the ball joint housing as it is held between two layers of the carrier part, and further allows to meet tight space requirements as the weld seams for attaching the ball joint housing can be made where space is available, e.g. spaced from the ball joint housing or directly between the attachment projection and the carrier part.

According to one embodiment, the attachment projection is constructed as a collar, in particular as annular collar which encircles the ball joint housing. The collar allows to optimize the transfer of forces between the ball joint housing and the carrier part whereby low stresses occur.

According to one embodiment, the ball joint housing has a receiving space for a ball stud which has a central axis, the annular collar defining a plane which is perpendicular to the central axis of the receiving space. Each point of the attachment projection therefore has the same distance from the upper edge and the lower edge of the housing, respectively. If the attachment projection is encircling, the housing is constructed so as to be rotationally symmetrical and therefore its production is simpler and cheaper. If the ball joint is to be attached inclined with respect to the general plane of extent of the carrier part, the two layers of the carrier part are bent adjacent the ball joint housing.

According to an alternative embodiment, the ball joint housing has a receiving space for a ball stud which has a central axis, the annular collar defining a plane which is oblique to the central axis of the receiving space. In order to mount the ball joint to the carrier part at a particular inclination, it was necessary hitherto to bend the carrier part adjacent to the housing differently according to the side of use on the vehicle. Now, a ball joint can be fitted with a different inclination both to the left-hand and to the right-hand carrier part of the vehicle, because of the attachment projection. The carrier parts can therefore be constructed identically for both sides, allowing cost savings.

The attachment projection can be extrusion-molded, forged or integrally formed with the ball joint housing in any other suitable manner so that the effort for forming a separate attachment provision is avoided.

According an one embodiment, the attachment projection is provided with two weld surfaces which are arranged on opposite sides thereof and which are welded to the carrier part. The most essential advantage of this solution consists in that a good transfer of force is possible owing to the large weld surface. In addition, lower costs are incurred, compared with the prior art.

According to an embodiment of the invention, the layers are connected to the weld surfaces of the attachment projection by capacitor discharge welding. In the capacitor discharge welding process, a high current flows only for a short period of time between the housing and the carrier part. During this, the material heats up locally in the region of its contact surfaces such that the materials weld to each other. The amount of heat released during the welding process is so small that for example a sealing bellows which is provided adjacent the welding surfaces is not impaired.

According to an alternative embodiment, the double-layer structure is formed from the carrier part as such and a reinforcement part which is attached to the carrier part so as to clamp the attachment projection between the carrier part and the reinforcement part. This allows to use a standard welding process such as MIG welding since the surfaces to be welded to each other are accessible.

Depending on the space available and the loads to be transferred between the carrier part and the ball joint housing, the reinforcement part is welded to the carrier part, the ball joint housing is welded to the carrier part, and/or the ball joint housing is welded to the reinforcement part.

According to a preferred embodiment, the carrier part is a bent sheet metal part, in particular a suspension arm of a motor vehicle.

Other advantages of this invention will become apparent to those skilled in the art from the following detailed description of the preferred embodiments, when read in light of the accompanying drawings.

DETAILED DESCRIPTION OF THE INVENTION

Figure 5:
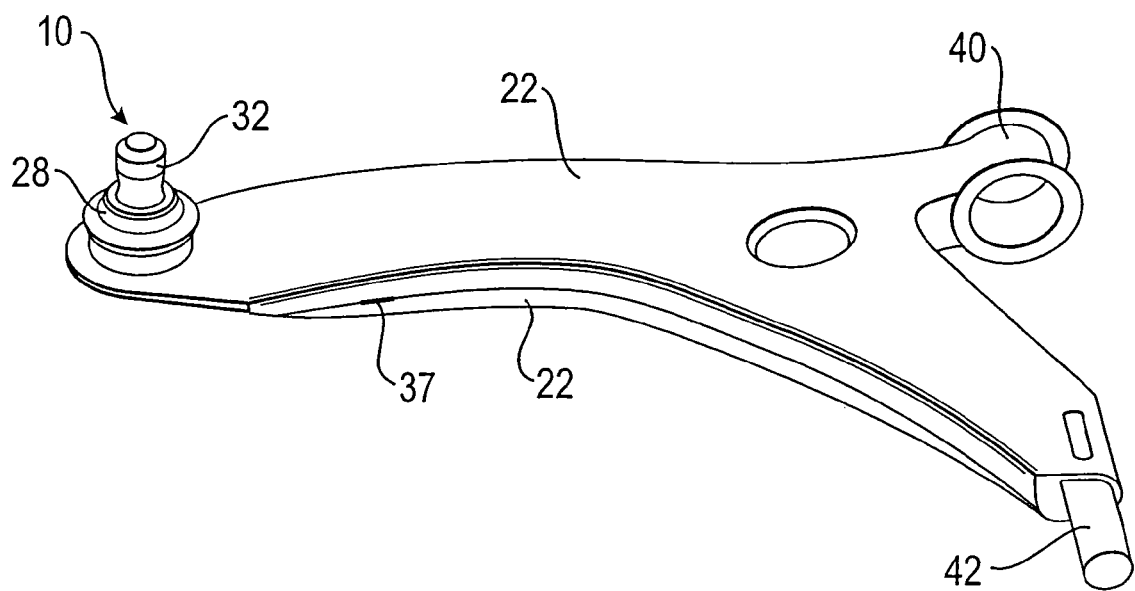
FIG. 5 shows a general perspective view of the assemblies of FIGS. 1 to 3.

A first embodiment of an assembly comprising a ball joint 10 and a carrier part 12 will be described with reference to FIGS. 1 and 5.

Carrier part 12 is part of the vehicle suspension system, in particular a control arm connecting a wheel carrier to the vehicle chassis or body. The carrier part is made from sheet metal and is formed at least in the region in which ball joint 10 is to be attached as a double-layer structure having two layers 22. Both layers 22 are provided with a circular recess 14 which is to accommodate the ball joint housing 16. The carrier part may be provided with a sleeve 40 and a cylinder 42 which are secured the carrier part and which serve for fastening the carrier part to the vehicle body.

The ball joint 10 has a housing 16 which is provided with an attachment projection 18 which is formed integrally with the ball joint housing 10, preferably by forging, flow-pressing or molding. Here, the attachment projection is formed as an annular ring which encircles ball joint housing 16. The plane in which the ring lies is parallel to the plane of extent of the layers 22 and perpendicular to a central axis A of the ball joint 10. As can be seen in FIG. 1, the diameter of recess 14 is slightly greater than the external diameter of the ball joint housing 16, but less than the outer diameter of the attachment projection 18.

Ring-shaped attachment projection 18 is provided with two circular bosses 36 lying opposite each other. In other words, a first circular boss extends on the upper side of the attachment projection around its circumference, and a second circular boss extends on the lower side of the attachment projection around its circumference.

In a manner known per se, the interior of the ball joint housing 16 receives a ball stud 24 in a receiving space 26 such that the ball stud can be swiveled relative to ball joint housing 16 by a certain angle.

A sealing bellows 28 is secured to ball joint housing 16 by means of a first, upper clamping ring 30 and to a stud portion 32 of the ball stud 24 by means of a second, lower clamping ring 34. It protects the ball joint 10 from dirt and humidity. The ball stud 24 can either be introduced into the ball joint housing 16 before it is arranged with the recess 14 in the carrier part 12 or can be introduced after the welding of the ball joint housing 16 to the carrier part 12.

To secure the ball joint 10 to the carrier part 12, particularly to the layers 22 of the carrier part 12, ball joint housing 16 is placed within recesses 14 in the carrier part 12 such that the attachment projection 18 lies between the two layers 22. A capacitor discharge welding method in which a high current flows for a short period of time between ball joint housing 16 and the carrier part 12, is particularly suitable for connecting the attachment projection 18 with the carrier part 12. This process results in locally heating the material in the region of contact between the circular lugs 36 on the attachment projection 18 and the associated surfaces of the carrier part 12, these region of contact forming two circular weld surfaces 20 at which the material of the ball joint housing and the carrier part weld to each other. A weld seam is therefore formed on opposite sides to each other of the attachment projection 18, which produces the inter-material bond between the housing 16 and the carrier part 12. Due to the shape of the attachment projection, two circular weld seams are formed which provide for uniform and reliable connection which allows to transfer high loads. As can be seen in FIG. 1, central axis A is perpendicular to the plane in which layers 22 of carrier part 12 extend.

A protection of the ball joint 10 and of the carrier part 12 against corrosion may be applied jointly after welding.

As an alternative design, the layers 22 could be formed so as to not extend continuously around ball joint housing 16 but be formed so as to have a couple of segments. Then, the weld surface 20 would be formed in an interrupted manner.

Figure 2:
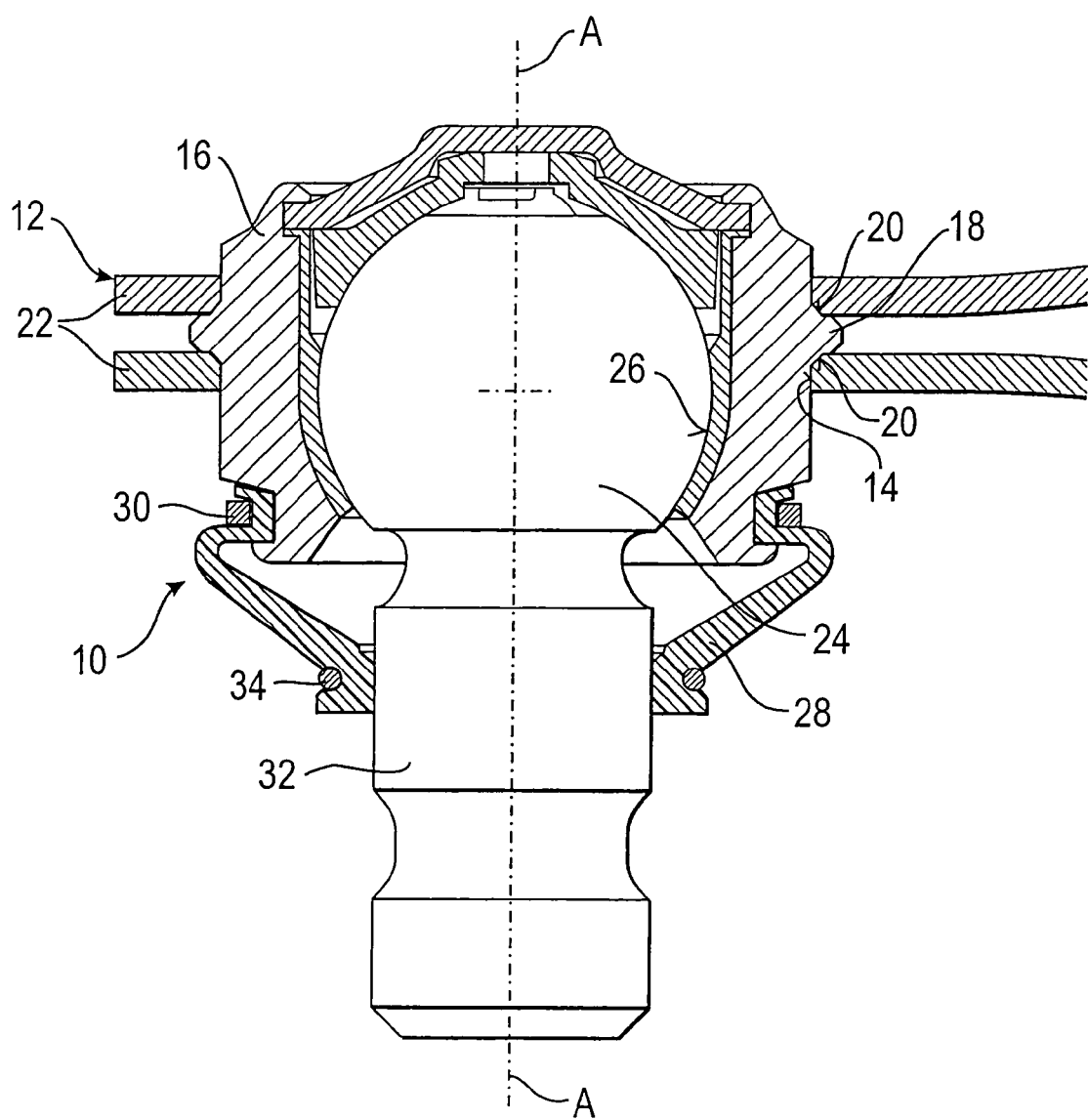
FIG. 2 shows a cross-section through an assembly with a ball joint housing and a carrier part according to a second embodiment of the invention.

A second embodiment is shown in FIG. 2. For the elements known from the first embodiment, the same reference numerals are used, and reference is made in this respect to the above comments.

The difference between the first and the second embodiment is that in the second embodiment, attachment projection 18 is formed chamfered on both sides. This results in that weld surfaces 20 are formed ring-shaped adjacent ball joint housing 16.

Figure 3:
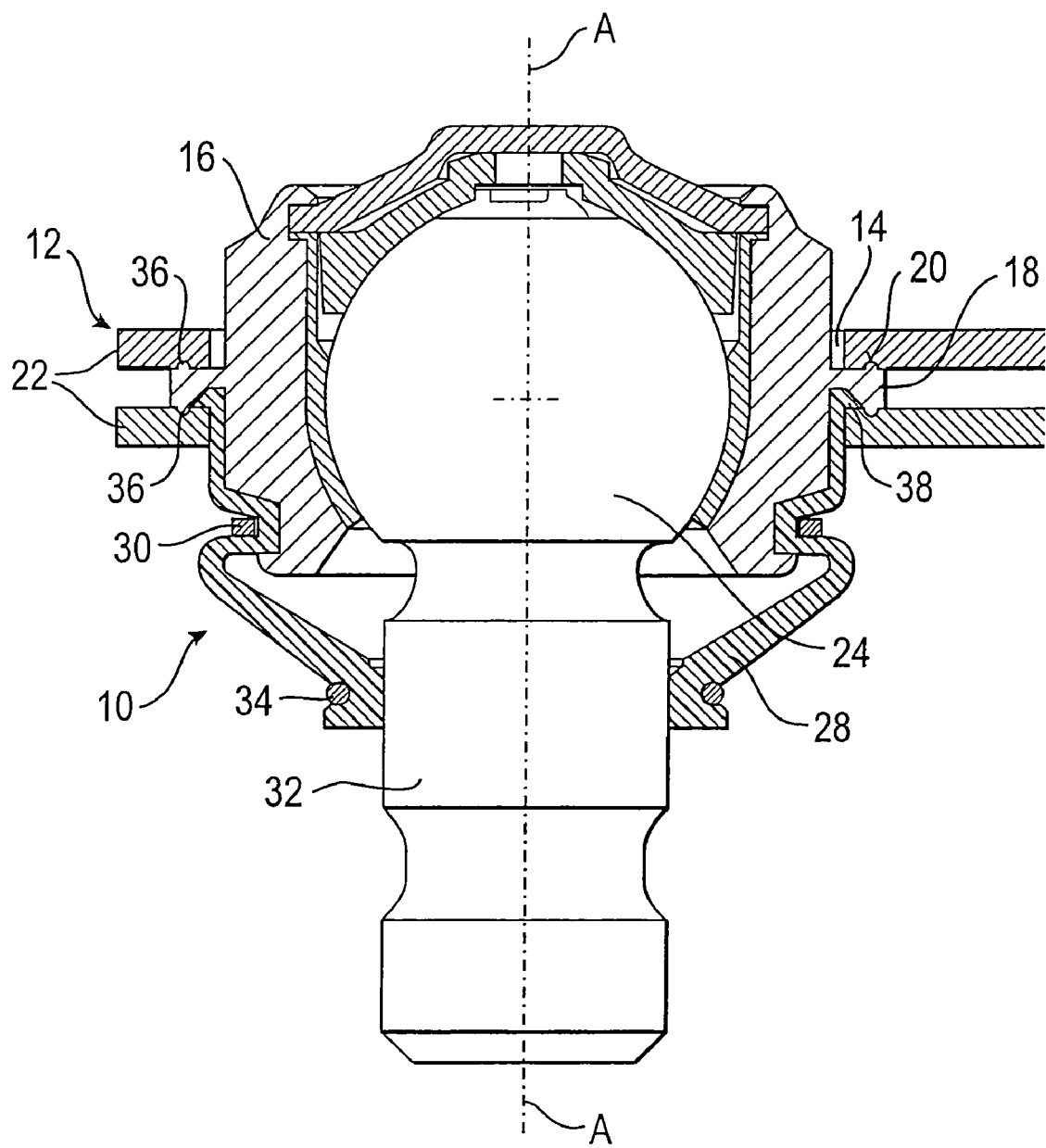
FIG. 3 shows a cross-section through an assembly with a ball joint housing and a carrier part according to a third embodiment of the invention.

A third embodiment is shown in FIG. 3. For the elements known from the first and second embodiments, the same reference numerals are used, and reference is made in this respect to the above comments.

The difference between the first embodiment and the third embodiment is that in the third embodiment, the sealing bellows 28 here has a clamping section 38 which is constructed as an encircling flange which is triangular when viewed in cross-section. The flange lies against the attachment projection 18 which is provided with the lugs 36, and is clamped particularly between the lower layer 22 of carrier part 12, the attachment projection 18 and the ball joint housing 16 such that it is reliably held there. The clamping ring 30 which is shown could therefore be dispensed with in this embodiment.

Figure 4:
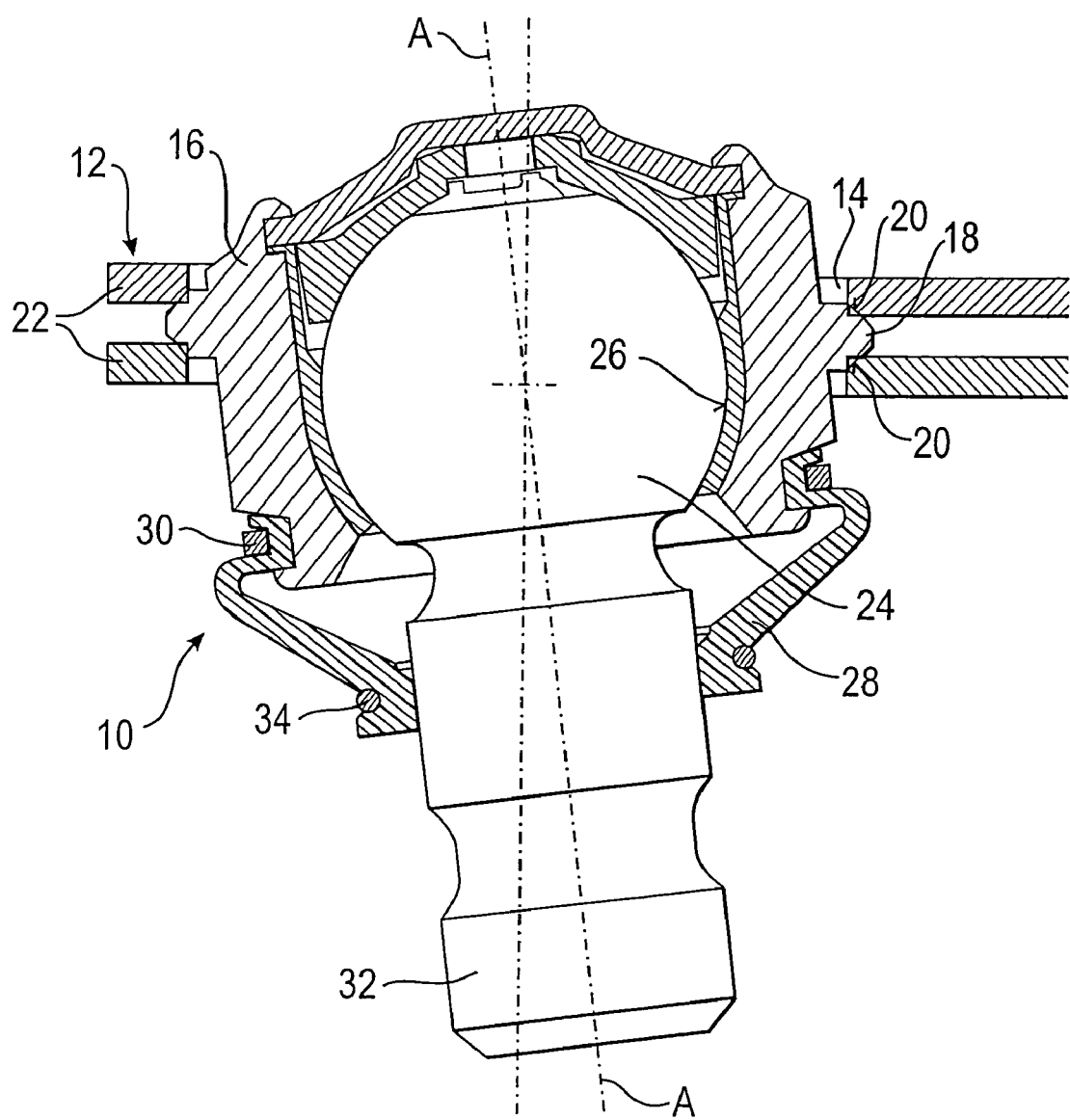
FIG. 4 shows a cross-section through an assembly with a ball joint housing and a carrier part according to a fourth embodiment of the invention.

A fourth second embodiment is shown in FIG. 4. For the elements known from the third embodiment, the same reference numerals are used, and reference is made in this respect to the above comments.

The difference between the third and the fourth embodiment is that in the fourth embodiment, attachment projection 18 extending around ball joint housing 16 is arranged obliquely with respect to the central axis A. In other words, the distance between the upper edge of the housing 16 and the attachment projection changes, and ball joint housing 16 is not rotationally symmetrical. In the mounted condition, central axis A through receiving space 26 of ball joint housing 16 is oblique to the plane of layers 22. The ball joint 10 is therefore welded to layers 22 at a particular inclination which can be varied through the construction of the attachment projection 18.

Figure 6:
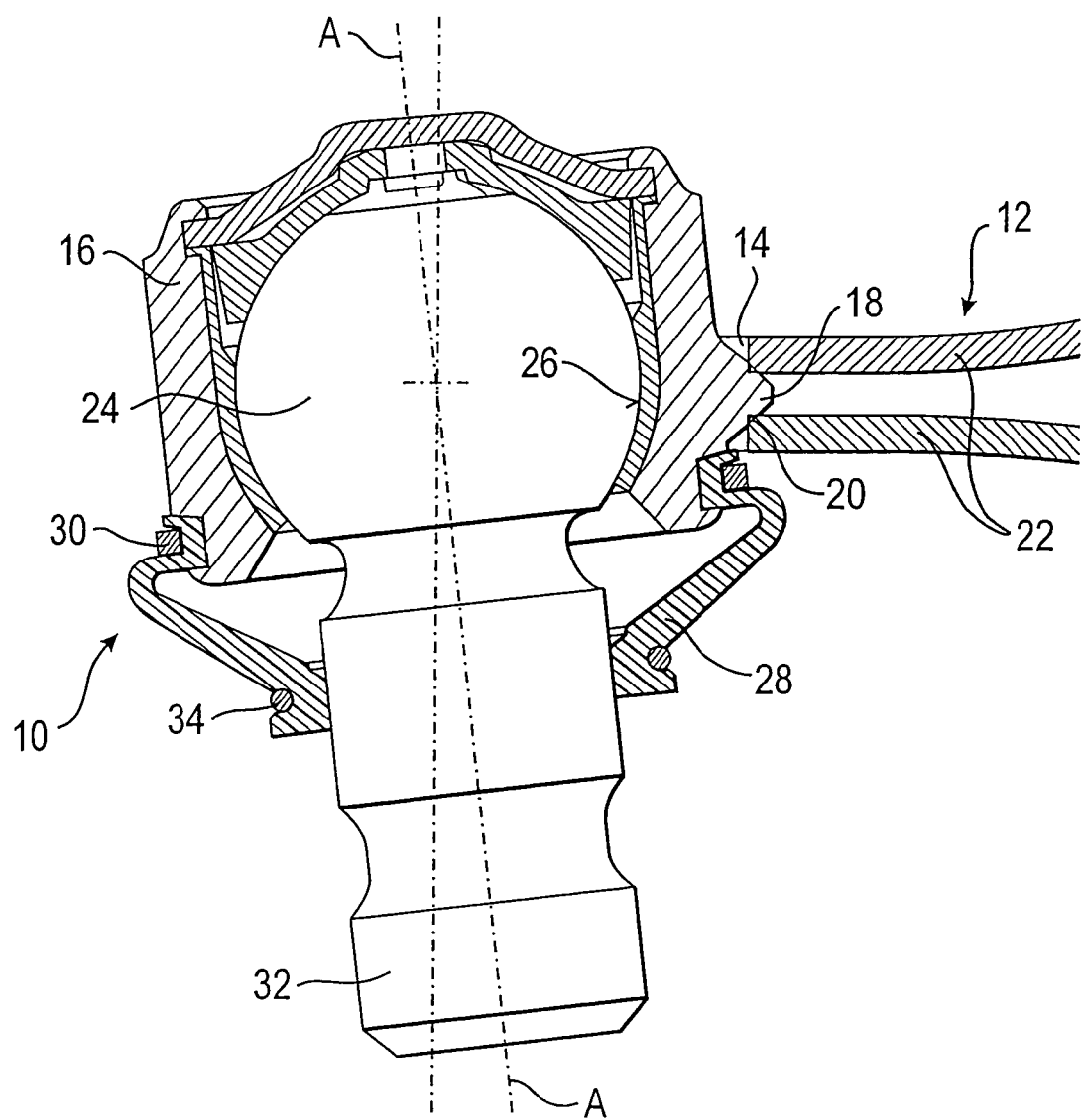
FIG. 6 shows a cross-section through an assembly with a ball joint housing and a carrier part according to a fifth embodiment of the invention.
Figure 7:
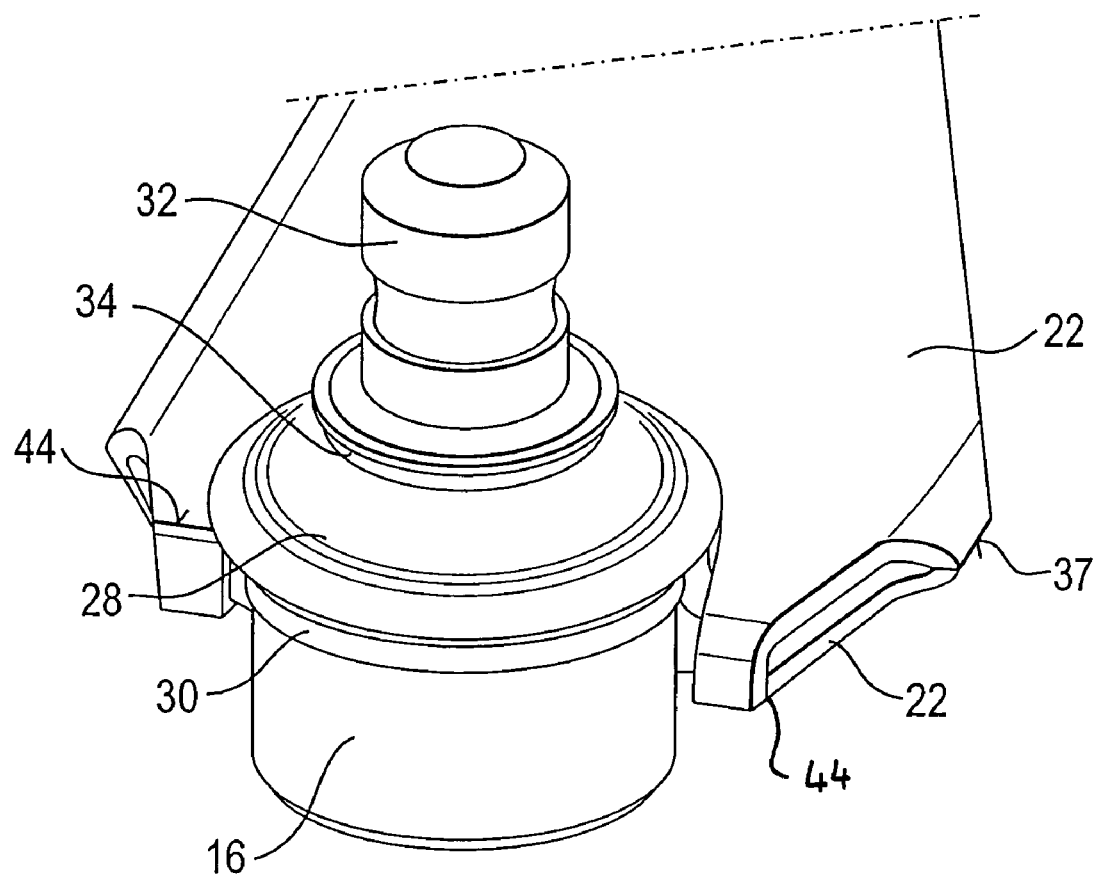
FIG. 7 shows a perspective view of the assembly of FIG. 6.

A fifth embodiment is shown in FIGS. 6 and 7. For the elements known from the fourth embodiment, the same reference numerals are used, and reference is made in this respect to the above comments.

The difference between the fourth embodiment and fifth embodiment is that in the fifth embodiment, attachment projection 18 does not extend around the entire housing but only along a portion which is less than 180°. Correspondingly, recess 14 in layers 22 of carrier part 12 has the shape of a circular segment. As the layers 22 do not fully surround the housing 16, this embodiment may be optimally adapted to conditions where space is restricted.

At the ends of the attachment projection 18, the layers 22 extend over the attachment projection in an alternating manner. The upper layer extends over the attachment projection on one side so that it can be bent downwardly towards the lower layer, and the lower layer extends over the attachment projection on the opposite side so that it can be bent upwardly towards the upper layer. Accordingly, the attachment projection is embraced (please see FIG. 7). The bent ends are then welded to the respective other layer such that weld seams 44 are created. In addition, the two layers 22 are additionally welded to each other in their marginal region (please see weld seam 37 in FIG. 7).

In the installed state, the central axis A through receiving space 26 of the housing is oblique to the plane of layers 22. However, the central axis A could also be perpendicular to the plane of layers 22 in an alternative embodiment which is not shown.

Figure 1:
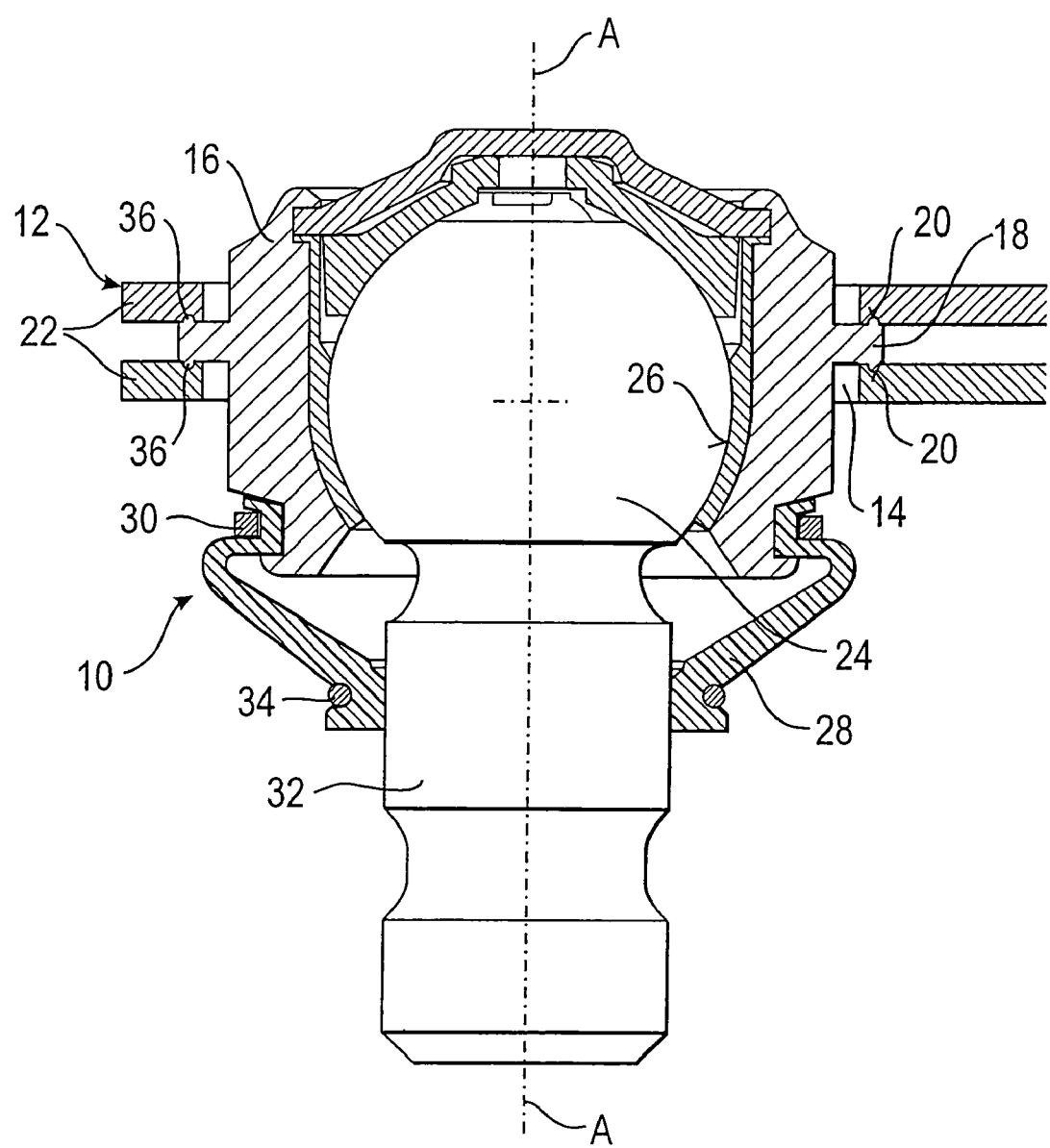
FIG. 1 shows a cross-section through an assembly with a ball joint housing and a carrier part according to a first embodiment of the invention.

In order to attach the ball joint 10 to the carrier part 12 at a particular inclination, the embodiments of FIGS. 1 to 3 require to bend layers 22 adjacent ball joint 10 differently, depending on which side of the vehicle the respective carrier part is to be installed. The ball joint 10 shown in FIGS. 4 and 6 however can be attached differently inclined both at the left carrier part and also at the right carrier part of the vehicle, due to the inclination of attachment projection 18. The carrier parts 12 as such can therefore be manufactured identically for the two sides.

Figure 8:
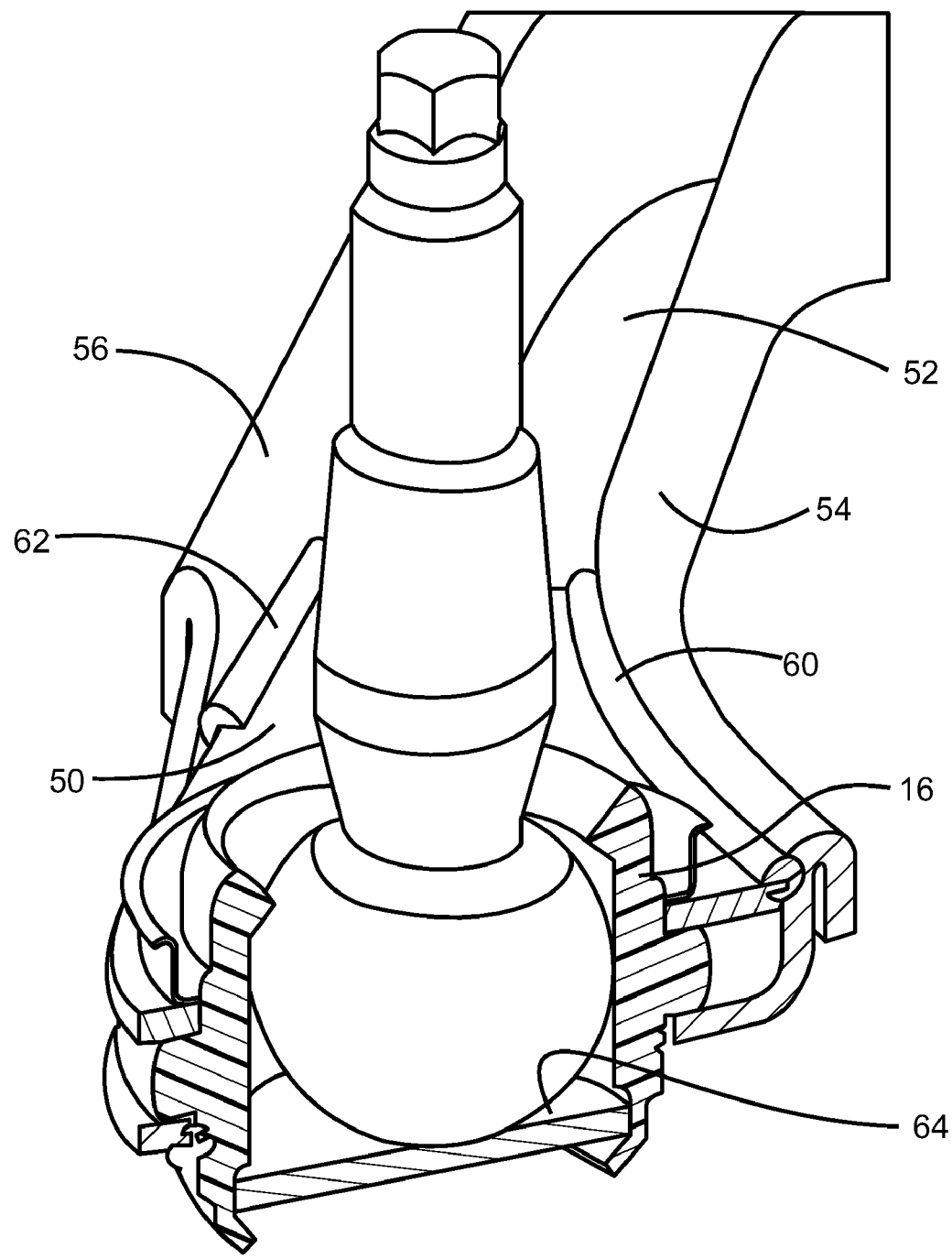
FIG. 8 shows a cross-section through an assembly according to a sixth embodiment of the invention.
Figure 9:
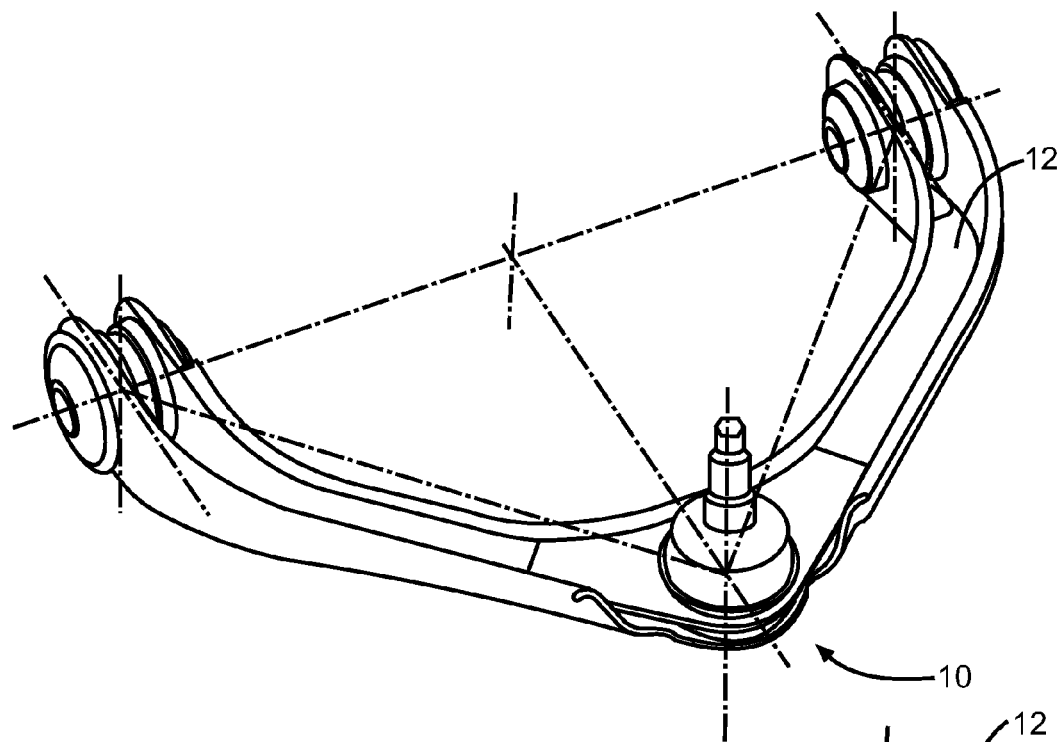
FIG. 9 shows the assembly according to the sixth embodiment in a first perspective view.
Figure 10:
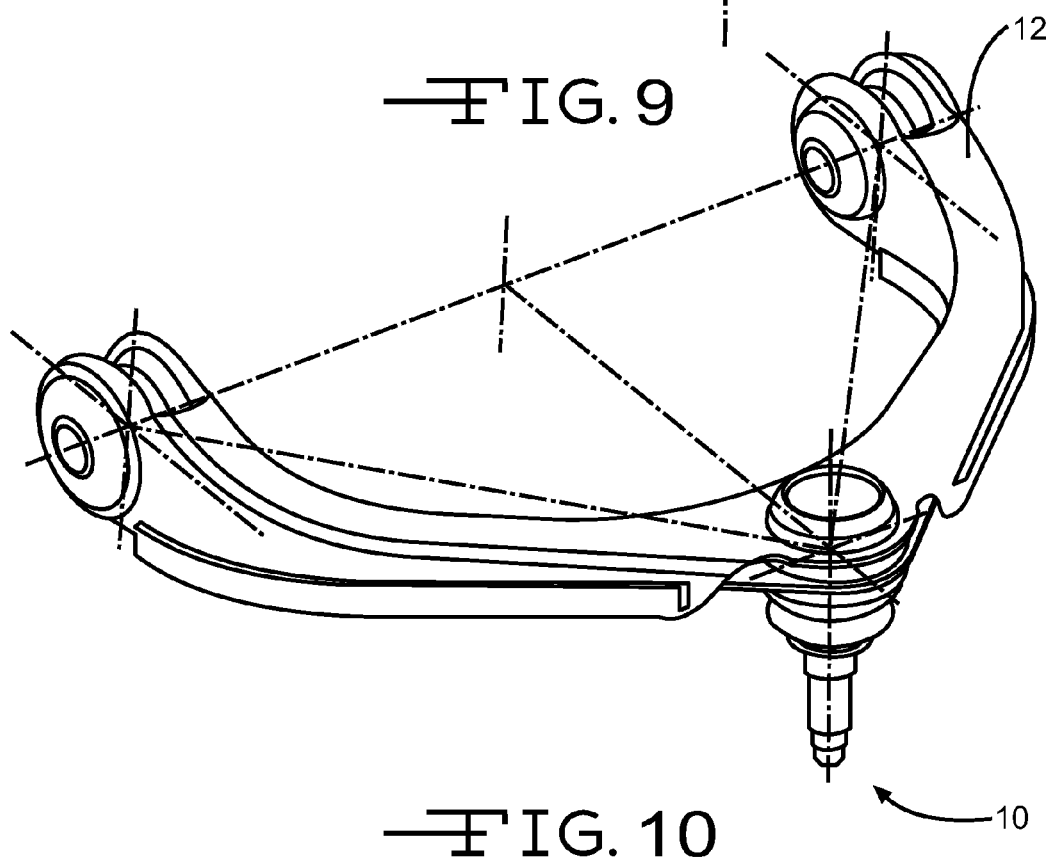
FIG. 10 shows the assembly according to the sixth embodiment in a second perspective view.

An assembly according to a sixth embodiment is shown in FIGS. 8 to 10. For the elements known from the previous embodiments, the same reference numerals will be used, and reference is made in this respect to the above comments.

Here again, the carrier part 12 is part of a vehicle suspension control arm which is made from stamped sheet metal. It has a generally U-shaped cross section with a base 52, an inner leg 54 and an outer leg 56. In the region of ball joint 10, outer leg 56 is interrupted so as to provide a clearance to adjacent components of the wheel carrier. Ball joint housing 16 is provided with attachment projection 18 which is formed as a ring which extends around the circumference of the housing.

The main difference between the sixth embodiment and the previous embodiments is that in the sixth embodiment, ball joint housing 16 is attached to carrier part 12 not by welding attachment projection 18 to the carrier but by clamping attachment projection 18 between a first and a second layer of the carrier part. In particular, attachment projection 18 is securely held between base 52 of carrier part 12 and a reinforcement part 50 fixed to the carrier part. Reinforcement part 50 is a stamped sheet metal part which is formed separately from carrier part 12 and which is arranged between legs 54, 56 of the carrier part.

Figure 11:
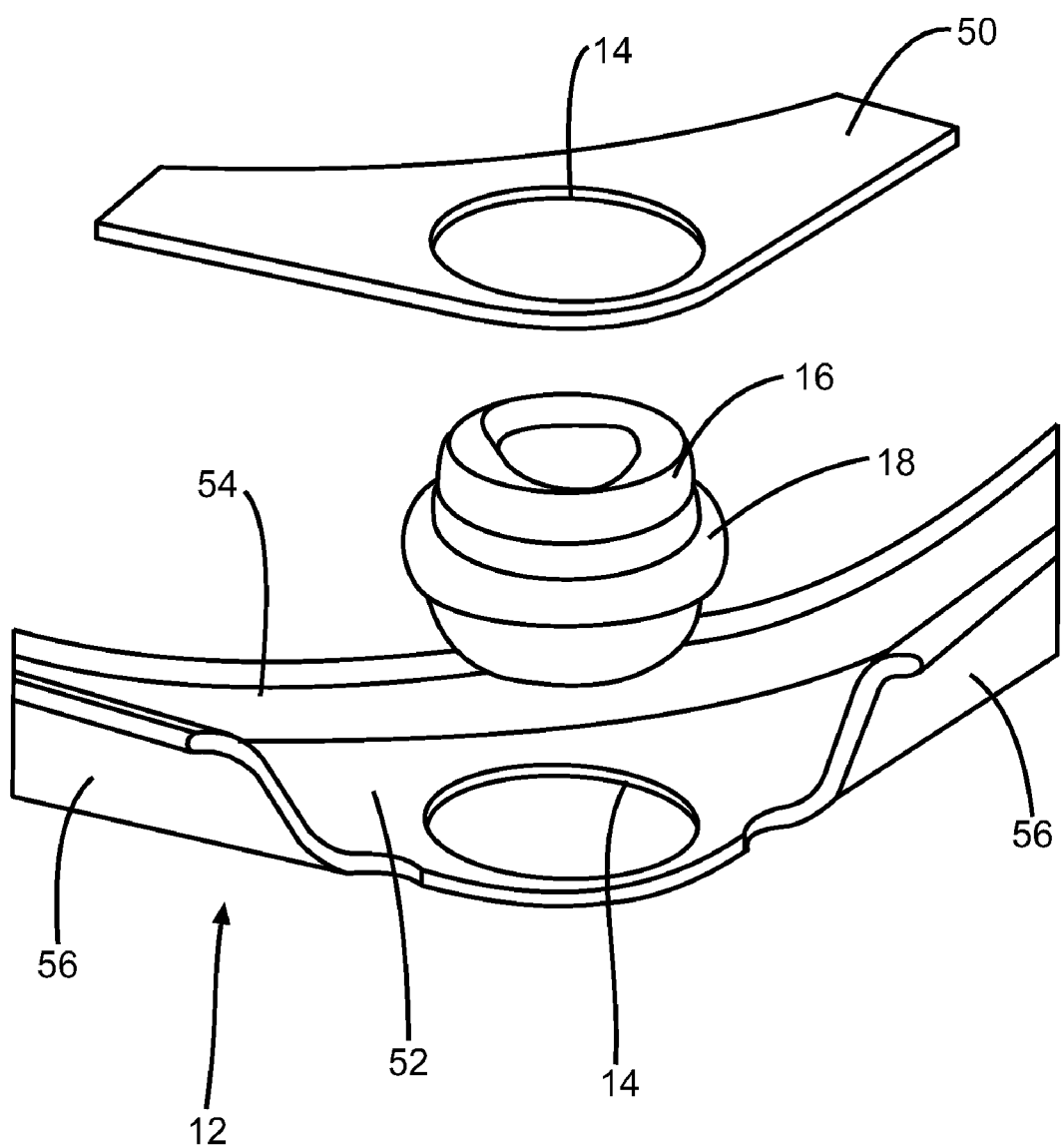
FIG. 11 shows a first step of assembling the assembly according to the sixth embodiment.

As can be seen in FIG. 11, both the base 52 of the carrier part 12 and the reinforcement part 50 are formed with a recess 14. The inner diameter of recess 14 basically corresponds to the outer diameter of ball joint housing 16 so that the ball joint housing is held therein without play.

Figure 12:
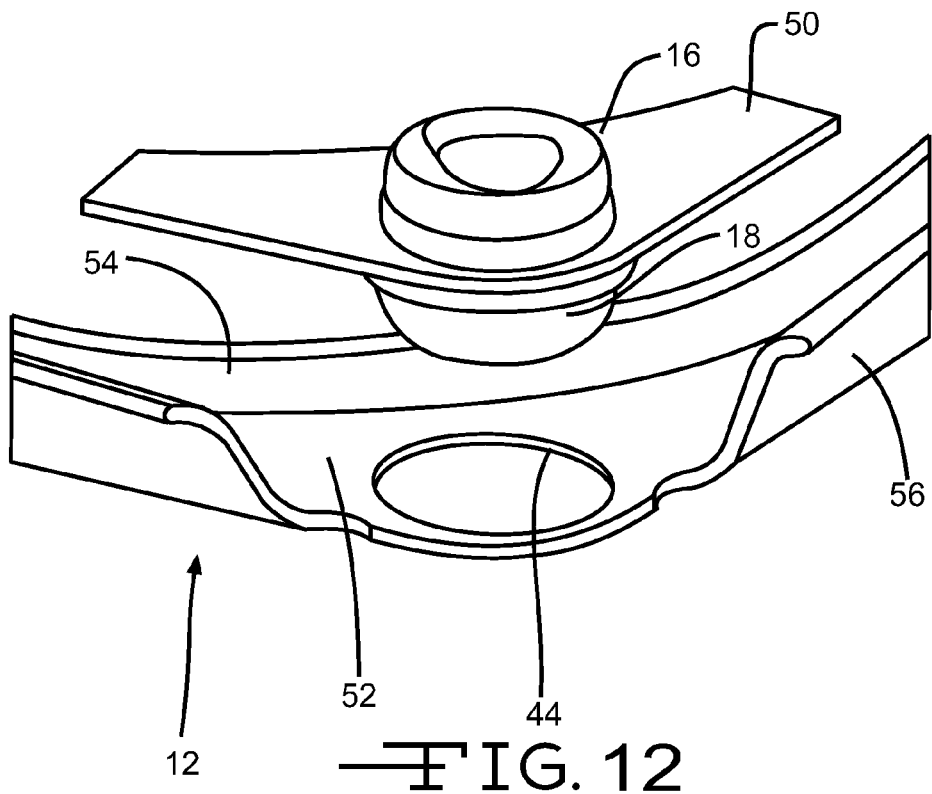
FIG. 12 shows a second step of assembling the assembly according to the sixth embodiment.
Figure 13:
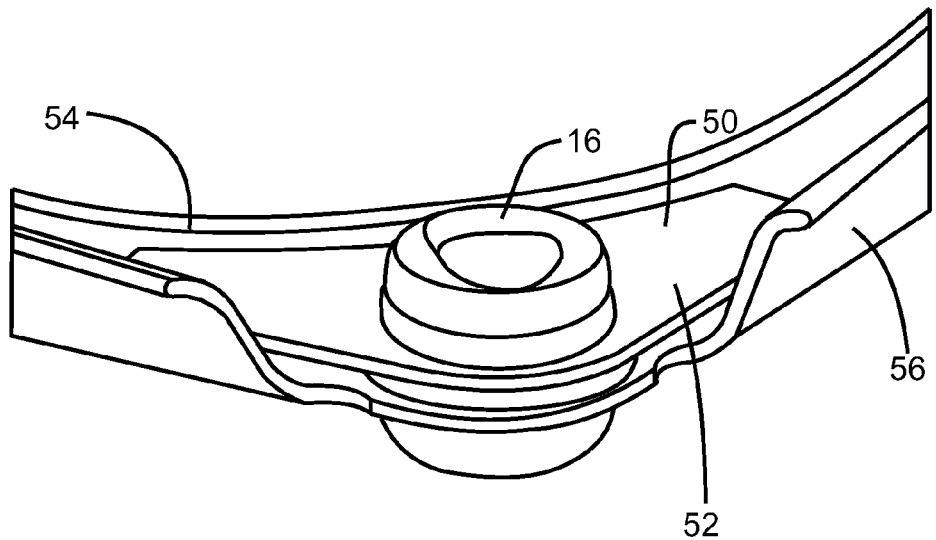
FIG. 13 shows a third step of assembling the assembly according to the sixth embodiment.

As can be seen in FIGS. 12 and 13, the reinforcement part 50, the ball joint housing 16 and the carrier part 12 are assembled such that attachment projection 18 is arranged between base 52 of carrier part 12 and reinforcement part 50, and reinforcement part 50 is arranged between legs 54, 56 of carrier part 12.

Figure 14:
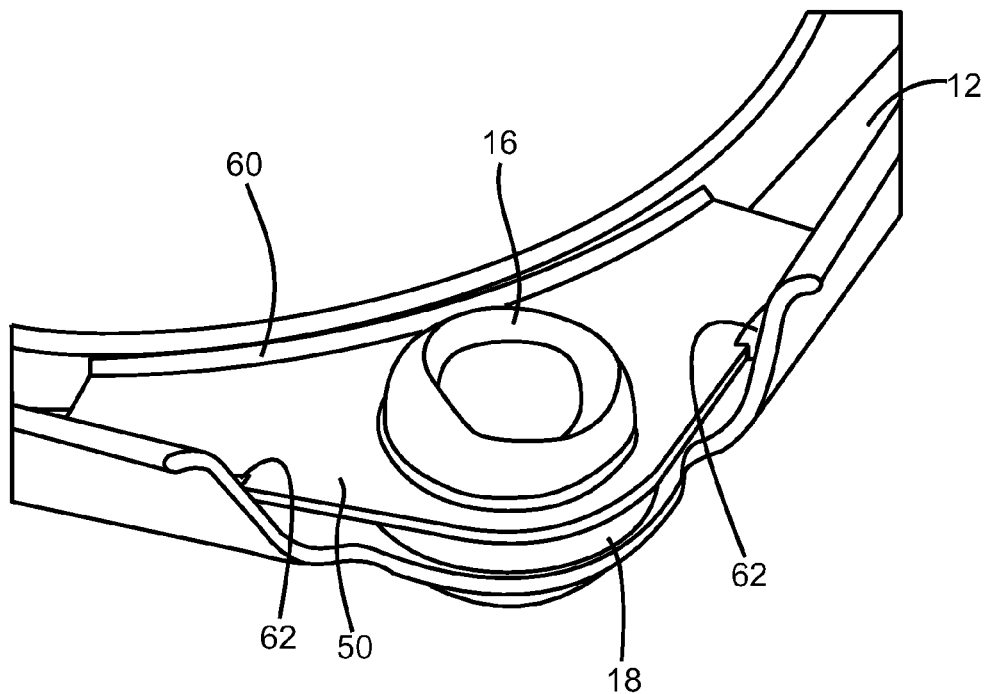
FIG. 14 shows a fourth step of assembling the assembly according to the sixth embodiment.

As is shown in FIG. 14, reinforcement part 50 is connected to inner leg 54 of carrier part 12 by means of a weld seam 60, and to outer leg 56 by means of two weld seams 62.

Figure 15:
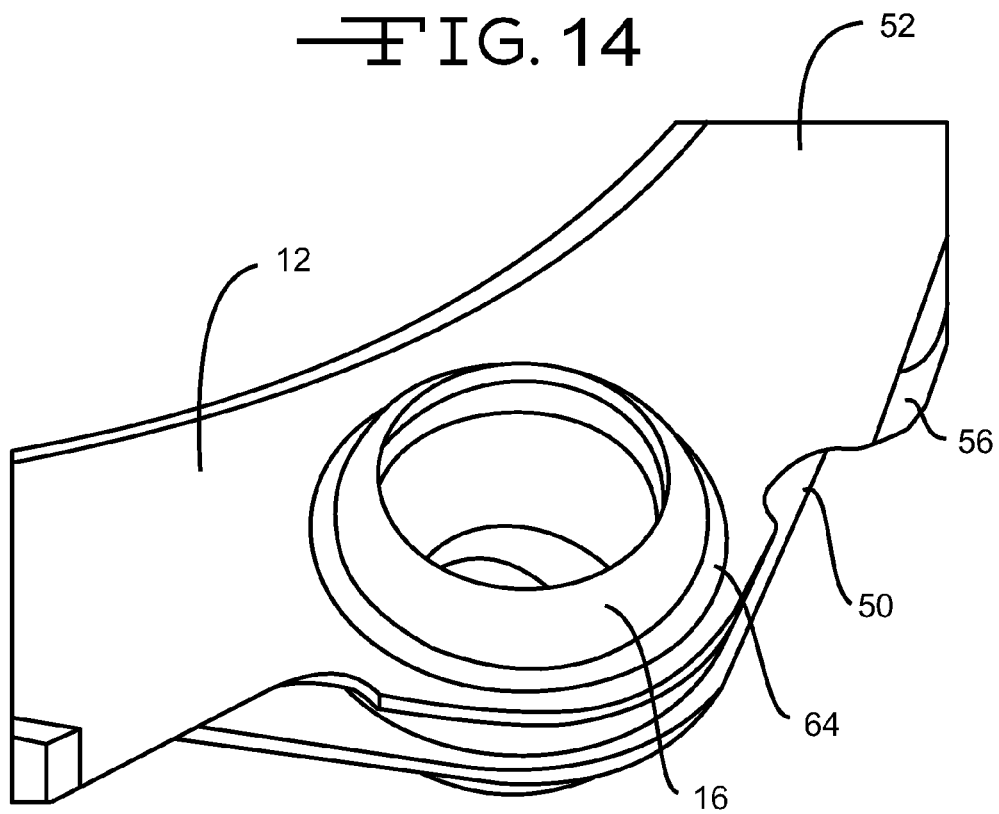
FIG. 15 shows a fifth step of assembling the assembly according to the sixth embodiment.

As can be seen in FIG. 15, ball joint housing 16 is connected to base 52 of carrier part 12 by means of a weld seam 64 which is arranged on the lower side of base 52.

All weld seams 60, 62, 64 can be made with a conventional welding process such as MIG welding or similar fusion welding processes.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle suspension assembly comprising:
   a ball joint housing having an interior receiving space for swivelably supporting a ball stud in the ball joint housing, the ball joint housing having an attachment projection which is formed integrally with the ball joint housing on a cylindrical outer surface thereof, the attachment projection being formed as an annular collar which encircles the ball joint housing and which extends radially outwardly from the ball joint housing; and
   a suspension control arm comprising a carrier part for connecting a wheel carrier to a vehicle chassis, the carrier part having fastening means for fastening the carrier part to the vehicle chassis and being formed as a double-layer structure comprising spaced apart opposing first and second plates, each of the first and second plates having a through opening for receiving the ball joint housing, the through openings being axially aligned;
   wherein the cylindrical outer surface of the ball joint housing is concentrically arranged within each respective through opening of the first and second plates, and the attachment projection is sandwiched between spaced apart opposing inner surfaces of the first and second plates of the carrier part such that the cylindrical outer surface of the ball joint housing is spaced from an edge of the through openings;
   wherein the attachment projection is provided with two opposing annular weld surfaces which are arranged on opposite sides of the annular collar and which are welded to the opposing inner surfaces of the first and second plates of the carrier part; and
   wherein the through openings of the first and second plates are each defined by an enclosed circular opening or an open recess in the form of a circular segment along an edge of each respective plate.

2. The assembly of claim 1 wherein the receiving space has a central axis, the annular collar defining a plane which is perpendicular to the central axis of the receiving space.

3. The assembly of claim 2 wherein the central axis of the ball joint housing is perpendicular to a plane of the first and second plates of the carrier part.

4. The assembly of claim 1 wherein the receiving space has a central axis, the annular collar defining a plane which is oblique to the central axis of the receiving space.

5. The assembly of claim 4 wherein the central axis of the ball joint housing stands obliquely on a plane of the first and second plates of the carrier part.

6. The assembly of claim 1 wherein the attachment projection is flow-pressed.

7. The assembly of claim 1, wherein the opposing inner surfaces of the first and a second plates are connected to the weld surfaces of the attachment projection by capacitor discharge welding.

8. The assembly of claim 1 wherein the carrier part is a bent sheet metal part.

9. The assembly of claim 1 wherein each through opening of the carrier part defines a circular opening having a diameter which is greater than an external diameter of the ball joint housing such that the two plates of the carrier part are configured to hold therebetween only the attachment projection of the housing.

10. A vehicle suspension assembly comprising:
a ball joint housing having an interior receiving space for swivelably supporting a ball stud in the ball joint housing, the ball joint housing having an attachment projection which is formed integrally with the ball joint housing on a cylindrical outer surface thereof, the attachment projection being formed as an annular collar which encircles the ball joint housing and which extends radially outwardly from the ball joint housing; and
a suspension control arm comprising a carrier part for connecting a wheel carrier to a vehicle chassis and a reinforcement part attached to the carrier part, the carrier part having fastening means for fastening the carrier part to the vehicle chassis, a double-layer structure being formed by a first plate of the carrier part and a spaced apart opposing second plate of the reinforcement part, each of the first and second plates having a through opening for receiving the ball joint housing, the through openings being axially aligned;
wherein the cylindrical outer surface of the ball joint housing is concentrically arranged within each respective through opening of the first and second plates, and the attachment projection is sandwiched between spaced apart opposing inner surfaces of the first and second plates of the carrier part and the reinforcement part such that the cylindrical outer surface of the ball joint housing is spaced from an edge of the through openings;
wherein the attachment projection is provided with two opposing annular weld surfaces which are arranged on opposite sides of the annular collar and which are welded to the opposing inner surfaces of the first and second plates of the carrier part and the reinforcement part; and
wherein the through openings of the first and second plates are each defined by an enclosed circular opening or an open recess in the form of a circular segment along an edge of each respective plate.

11. The assembly of claim 10 wherein the reinforcement part is welded to the carrier part.

12. The assembly of claim 10 wherein each through opening of the carrier part and the reinforcement part defines a circular opening having a respective diameter which is greater than an external diameter of the ball joint housing such that the two plates of the carrier part and the reinforcement part are configured to hold therebetween only the attachment projection of the housing.

* * * * *